April 8, 1924.
A. D. PHILPOT
1,489,275
TALKING MACHINE
Filed May 3, 1922
3 Sheets-Sheet 1
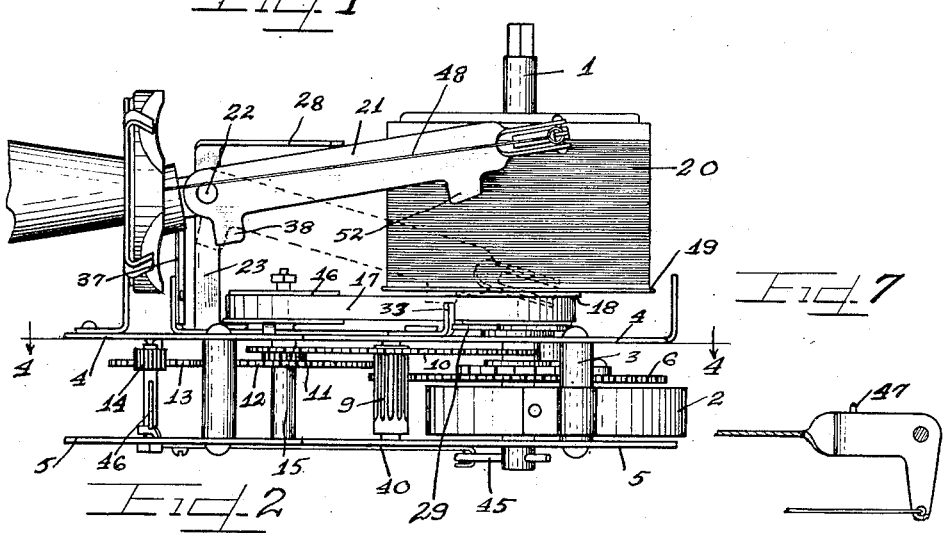
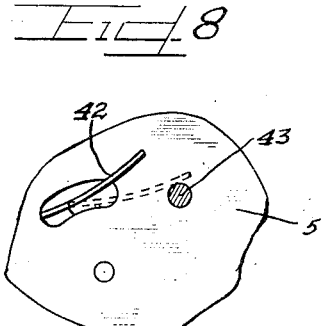
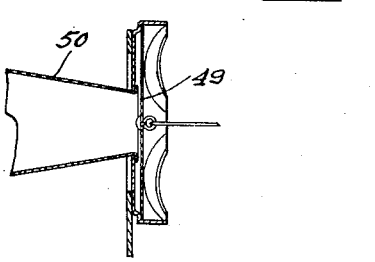
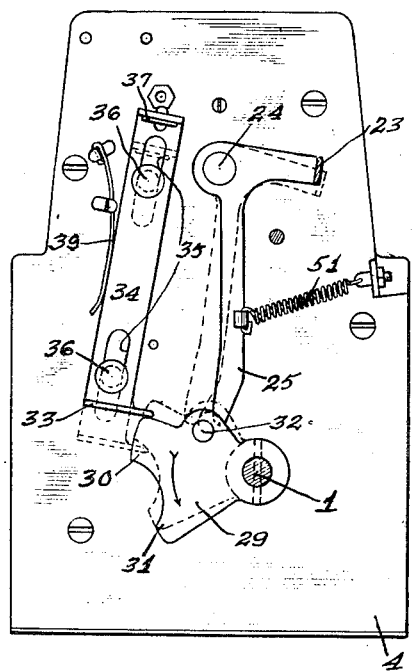
Witnesses
Rudolph T. Berg.
Inventor
ALBERT D. PHILPOT.
By
Atty.

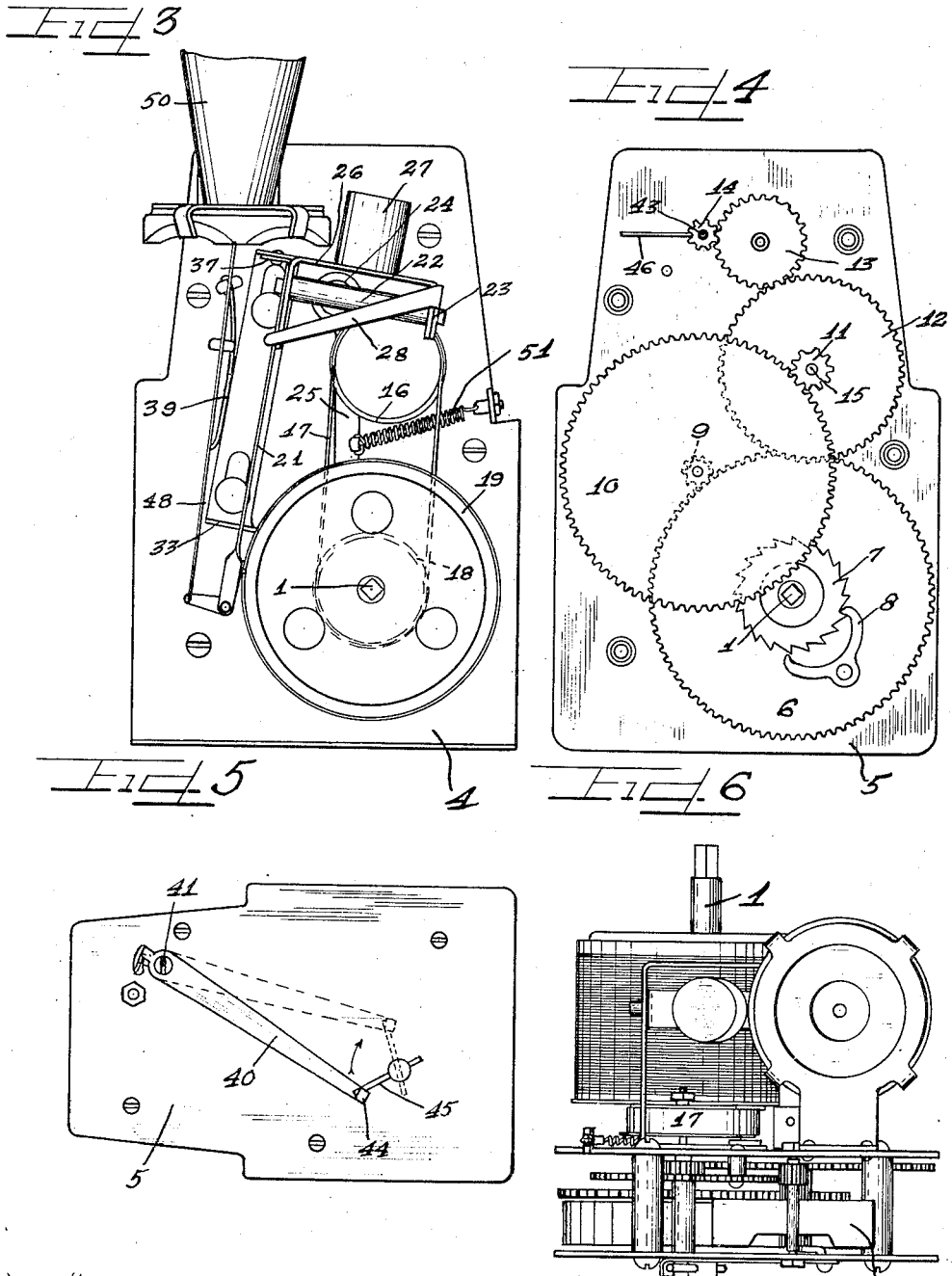

April 8, 1924.
A. D. PHILPOT
1,489,275
TALKING MACHINE
Filed May 3, 1922
3 Sheets-Sheet 3
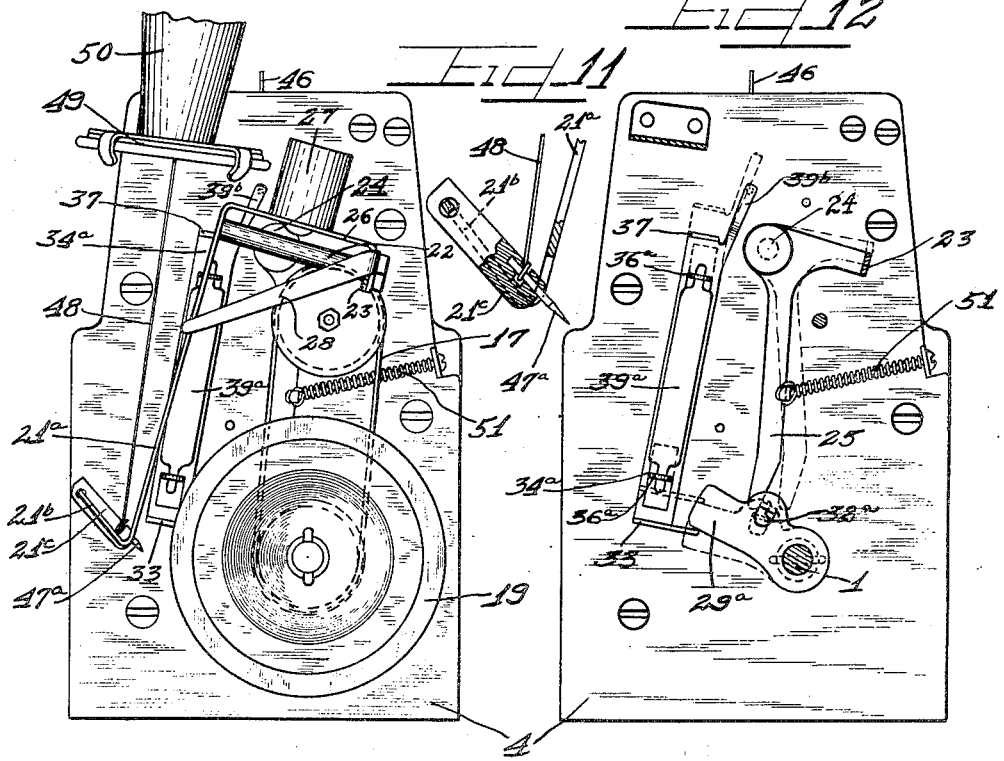
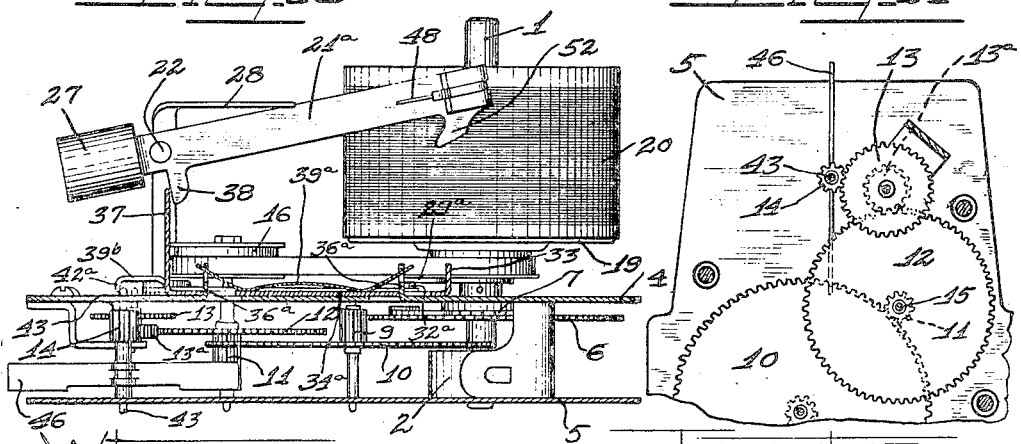

Patented Apr. 8, 1924.

1,489,275

UNITED STATES PATENT OFFICE.

ALBERT D. PHILPOT, OF CHICAGO, ILLINOIS.

TALKING MACHINE.

Application filed May 3, 1922. Serial No. 558,092.

*To all whom it may concern:*

Be it known that I, ALBERT D. PHILPOT, a citizen of the United States, and a resident of the city of Chicago, in the county of Cook and State of Illinois, have invented certain new and useful Improvements in Talking Machines; and I do hereby declare that the following is a full, clear, and exact description of the same, reference being had to the accompanying drawings and to the numerals of reference marked thereon, which form a part of this specification.

My invention relates more particularly to an automatic control for phonographs or talking machines which are designed to be placed in the body of a doll or the like to produce what I term a talking doll.

And it is an object of this invention to provide mechanism for automatically controlling the stylus bar.

It is a further object of this invention to provide positive stops for arresting the operating shaft at the starting and stopping points.

It is broadly an object of this invention to provide a phonograph motor of such size and dimensions and control that the same may be placed in a practically inaccessible place and functions automatically therein.

With these and other objects in view, which will become more apparent in the following description and disclosure, this invention comprises the novel mechanisms and combinations hereinafter described and more particularly pointed out and defined in the appended claims.

In the accompanying drawings, which illustrate certain preferred embodiments of this invention, and in which similar reference numerals refer to similar features in the different views:

Figure 1 is a side elevational view of the operating mechanism of a phonograph embodying my invention.

Figure 2 is a top plan view with parts removed to illustrate more clearly the automatic control for the stylus bar, upon an enlarged scale.

Figure 3 is a top plan view of Figure 1.

Figure 4 is a sectional view on the line 4—4 of Figure 1.

Figure 5 is a bottom plan view illustrating the braking mechanism for the phonograph.

Figure 6 is a top plan view of Figure 3.

Figure 7 is a detail of the stylus mechanism upon an enlarged scale.

Figure 8 is a detail showing the brake upon an enlarged scale.

Figure 9 is a section through the diaphragm showing the horn in section.

Figure 10 is a plan view of a modified structure for controlling the stylus.

Figure 11 is a fragmentary sectional view of a modified form of stylus upon an enlarged scale.

Figure 12 is a plan view similar to Figure 10, with parts removed.

Figure 13 is a part elevational and part sectional view through my modified form.

Figure 14 is a fragmentary internal plan view of a portion of the operating mechanism for my modified form showing a slightly different location of certain parts.

As shown on the drawings:

In the drawings, I have illustrated the usual spring motor and gearing that operates the record cylinder, but in order that my invention may be clearly understood, I will proceed to briefly describe this operating mechanism. The spring or power shaft 1, which may be also termed and operated driving shaft, has one end of the spring 2 secured thereto. This spring is coiled around the shaft and has its other end secured to a post 3 which separates the upper and lower plates 4 and 5, between which the gearing is housed. The spring 2, when wound up, will rotate the shaft 1 which is connected to a gear 6 concentric therewith through a ratchet wheel 7 secured on said shaft and a pawl 8 secured to the gear. The rotation of gear 6 will set in motion a train of gears 9, 10, 11, 12, 13 and 14 supported on posts or shafts between said plates, as is clearly shown in Figures 1 and 4. The shaft 15, upon which the gears 11 and 12 are secured, extends above the plate 4 where it has a belt pulley 16 secured thereto. A belt 17 leads from this pulley to a pulley 18 secured to, or integral with the cylinder 19 that is rotatably mounted upon the shaft 1, and that supports the record cylinder. The arrangement of parts is such that the spring 2 will rotate shaft 1 in an anticlockwise direction and through the aforementioned gearing and belt, rotate the cylinder 19 and the record cylinder 20 carried thereby. The stylus of the phonograph co-operates with the cylinder 20 for reproducing the record thereon.

My invention concerns itself primarily with mechanism for automatically controlling the stylus during the operation of the phonograph and for automatically stopping and starting the spring motor through the rotation of the spring wound shaft.

The driving mechanism is so designed that the relative speeds of the cylinder 20 and shaft 1 are such that the stylus will have completely traversed the record cylinder during substantially a revolution of shaft 1.

In referring now more specifically to Figures 1 to 9, there is illustrated a novel form of stylus bar 21 pivotally mounted on a horizontal trunnion 22 so that said bar can swing in a vertical plane. This trunnion 22 is secured on a standard 23 which has a horizontal foot pivoted at 24 to the plate 5 of the housing. This foot is also provided with an operating arm 25 for swinging the standard on the pivot 24 so that the stylus can be brought into contact with the record cylinder at the beginning of an operation and removed therefrom at the end of an operation. The stylus bar 21 is preferably provided with a U-shaped bearing device 26 journalled on the trunnion 22 and provided with a counter-balance weight 27, and to limit the upward swing of the stylus bar as viewed in Fig. 1, there is a stop member 28 which is preferably integral with the supporting standard 23.

To automatically swing the stylus bar 21 in a vertical plane and rotate or swing the standard 23 on the pivot 24, I have illustrated in the present embodiment of my invention the following mechanism: A device or cam member 29 is secured on the shaft 1 in proximity to the plate 4, and this cam member is provided with two cam projections or parts 30 and 31 and a lug 32 which extends below the cam and is adapted to strike the arm 25 to swing the standard so that the stylus bar will move away from the record cylinder. The cam parts 30 and 31 are designed to co-operate with an abutment 33 on a slidable member 34 to slide the same up and down and to stop the shaft 1 at the beginning and end of a record. Said member 34 is slidingly mounted on the plate 4 by means of a pair of slots 35 and bolts 36. The slidable member 34 is also provided at its end opposite the abutment 33, with a yieldable trip member 37 designed to strike the projection 38 on the stylus bar to shift the same to initial position. To properly hold the member 34 in adjusted position, a yieldable plate spring 39 is secured on the plate 5 and frictionally engages the member 34 as shown in Figures 2 and 3.

In Figure 5 I have illustrated a brake mechanism secured to the lower surface of plate 5, and adapted to be put in operation by the shaft 1 at the completion of the record which in the present case occurs at the end of substantially a revolution of said shaft 1. And as shown this broke mechanism comprises a lever member 40 pivoted at 41 and having a downwardly turned end 42 (see Fig. 8) directed through an arcuate slot in the plate 5 and adapted to be moved into frictional contact with a governor shaft 43 which is the end of the gear train previously described. The lever member 40 has a hook or projection 44 at the end of its power arm, which is adapted to be engaged by a stop pin 45 projecting from the shaft 1 at a point just below the plate 5, to shift the brake lever 40 to operative or inoperative position. The brake lever 40 is limited in its movements by the ends of the arcuate slot which can be so designed that the shaft 1 will be arrested by the lever 40 at both the beginning and end of a record, as shown in Fig. 5, in which the dotted line position illustrates the completion of a record and the application of the brake to the governor shaft 43 which is supplied with the usual governor 46 and the full line position illustrates the position of shaft 1 at the beginning of a record.

The stylus 47 is pivotally supported on the bar 21 by means of a bell crank lever and is connected by means of the wire 48 with the diaphragm 49 which is supplied with the horn 50 as is usual and common in the art. This phonograph is adapted to be placed in the body of a doll so that the horn 50, if one is used, will project upwardly toward the head or into the head of the doll.

The operation is as follows:

In order to clearly understand the functions and operation of my improved mechanism, I will now describe the complete operation involved in the reproduction of a record and the necessary operation involved in starting another record. In the construction of the phonograph, it is assumed that the spring 2 will be properly wound up and tensioned since it can only be unwound by substantially one revolution of shaft 1, and let it be further assumed that the parts are in the position illustrated in Figures 1 and 2 in which the spring 51 has drawn the standard 23 so that the stylus 47 will be in contact with a record cylinder and in which the cam projection 30 is in contact with the abutment 33 of member 34 which has been moved up so that the yieldable abutment 37 is free from the stylus arm 21. It will be noted that this position of cam 29 and shaft 1 is the limit of their movement in a clockwise direction and that they are arrested at this point by the member 34 and its abutment 33. This is the initial or starting position of the mechanism for each record or a repeater thereof, and is attained by placing a key or crank on the shaft 1 and rotating the same in a clockwise direction, during which rotation the spring 2 will be rewound and the gear 6 will remain stationary, as is obvious. If shaft 1 is released with the parts as shown in the drawing, the spring 2 will rotate shaft 1 in an anti-clockwise direction and through the train of gears and belt 17, the record cylinder 20 will be rotated, and the stylus 47 will gradually move transversely thereof, as is well known. When the stylus has reached the end of the record cylinder, the beveled lug 52 of the stylus bar 21 may find a support on the top of the abutment 33, and at this time the lug 32 will strike the standard arm 25 and swing the standard 23 so that the stylus will be lifted from the record cylinder, and at substantially the same time the lug 30 will strike the abutment 33 and slide the member 34 so that the yieldable trip 37 will strike the abutment 38 and swing the stylus bar 21 to initial position against the stop member 28; the cam part 31 passing the abutment 33 in this direction of rotation but being effective upon the reverse rotation to slide member 34 into inoperative position with trip 37 out of contact with lug 38. It should be noted that the member 34 must be moved to some extent before the trip 37 will engage the abutment 38, thus allowing sufficient time for the stylus bar to be raised from the record cylinder. The cam part 30 will obviously slide the member 34 downwardly as far as possible, at which point further rotation in an anti-clockwise direction is prevented by the abutment 33 and the mechanism becomes locked. And at this point the operating shaft 1 will also have rotated the brake lever 40 into the position shown in dotted lines in Fig. 5, in which position the brake has been applied to the governor shaft 43. If it is now desired to repeat the record, or reproduce a new one which can be readily placed on the cylinder, the operating shaft 1 is rotated in a clockwise direction by means of a key or the like until the parts will assume the positions illustrated in the drawings in which the spring 51 will have drawn the stylus into contact with the record cylinder and the cam part 31 will have shifted the yieldable trip 37 out of contact with the stylus bar whereby the same becomes free to move transversely of the record cylinder, and the brake 42 will also have been released. If the operating shaft 1 is now released, the spring 2 will rotate it in an anti-clockwise direction and the operation of reproducing the record will begin.

In Figs. 10 to 14 I have illustrated a modified structure for controlling the stylus bar and for starting and stopping the driving mechanism and a modified form of stylus mechanism which are simpler than those shown in the first form and possess certain advantages thereover.

In this modified structure, a slidable plate member 34ª provided with slots and end abutments 33 and 37 similar to the slots and abutments of plate 34, is slidingly guided by the tongues 36ª which are struck up from the base plate 5 and which extend through the slots in said plate. The plate 34ª is yieldingly held in its different adjusted positions by means of a leaf spring 39ª which presses upon the top of the plate, and which is provided with upwardly diverging ends extending through apertures in the lugs 36ª. The plate 34ª is provided with a friction brake which is effective for stopping the driving mechanism at the end of a record and for releasing the driving mechanism when it is desired to begin a record. In the form shown, this friction brake is formed by a tail piece 39ᵇ which extends from the upper end of the plate 34ᵇ, and which is so formed as to provide a recess or space therebeneath for accommodating the projecting end of the governor shaft 43 which projects above the plate 4, as shown in Fig. 13, the upper or outer end of said tail piece being provided with a downwardly projecting lug 42ª which is adapted to frictionally engage the upper end of the governor shaft and exercise a braking action thereon for stopping the operation of the driving mechanism and the record cylinder. To accomplish this, the governor has been shifted slightly from the position shown in the first form.

The slidable plate 34ª is actuated by a cam 29ª secured to the driving shaft 1. This cam is slightly different from the cam 29 in that it has but one cam portion for engaging the abutment 33. A lug 32ª is stamped from the cam for engaging the lever 25 for raising the stylus from the record at the end of a record.

The modified form of stylus mechanism is best illustrated in Figs. 10 and 11, in which the stylus bar 21ª is provided with an angled end 21ᵇ upon which the stylus support 21ᶜ is pivotally mounted. The stylus or needle 47ª is suitably secured in an aperture in the stylus support 21ᶜ, and a transverse recess extends into the aperture so that the vibration carrying wire 48 which extends from the diaphragm 49 may be directly connected to the needle or stylus 47ª. It has been found that by attaching the wire directly to the needle and arranging the same so that the operative effect of the rotation of the record will tend to tension the wire, a more distinct and clearer reproduction of the record is attained.

The operation of this modified structure is as follows: Starting with the parts in the positions shown in Figs. 10 to 14, which are the positions of the parts at the completion of a record, the shaft 1 is turned in a clockwise direction, thereby winding the spring 2 and rotating the cam 29ᵃ, the train of gearing remaining idle on account of the ratchet connection 7 and 8. When the shaft 1 has been turned nearly one revolution, the cam 29ᵃ will strike the outer side of abutment 33 and shift the slidable plate 34ᵃ in an upward direction whereby the lug 42ᵃ will be moved out of frictional contact with the governor shaft 43, allowing the same and the driving gears to rotate under the influence of the spring 2. At the same time, the upper abutment 37 on the slidable plate 34ᵃ will be moved out of contact with the lug 38 of the stylus arm 21ᵃ, allowing the same to move across the record. As soon as the governor shaft 43 is released by the brake, the spring 2 will rotate shaft 1 in an anti-clockwise direction, as viewed in Fig. 10, and through the gears 6, 10, 11 and belt 17 the record cylinder will be rotated, the governor 46 being rotated through the train of gears 12, 13ᵃ, 13 and 14, which train of gears is operated by the said gear 11. The train of gears for driving the record cylinder has such a ratio in relation to the speed of the shaft 1 that the playing of a record will be completed by the time the shaft 1 has made substantially one revolution. Accordingly, as the cam 29ᵃ, which rotates with the shaft 1, nears the completion of its anti-clockwise arc of rotation, the playing of the record will have been completed, and the lug 32ᵃ will engage the lever arm 25 and shift the same, thereby elevating the stylus arm 21ᵃ above the record 20. As soon as the stylus bar has been thuswise elevated, the cam 29ᵃ will engage the inner side of abutment 33, which will be in the dotted line position shown in Fig. 12, and will slide the plate 34ᵃ into the full line position shown in Fig. 12, thereby causing the abutment 37 to engage the lug 38 for swinging the stylus bar 21ᵃ to initial starting position, and also causing the lug 42ᵃ to frictionally contact the governor shaft 43 for stopping the rotation of the driving mechanism. It should be noted that the complete control of the stylus bar and the starting and stopping of the spring motor are rendered automatic so that it will be possible to insert the motor in some inaccessible place as a doll's body with only the shaft 1 projecting therefrom for producing a talking doll.

While the parts are so designed that the shaft 1 makes substantially only one revolution during the playing of a record, it should be understood that the relative speeds of the driving gears and the shaft 1 may be varied so that any suitable predetermined arc or cycle of rotation of shaft 1 and cam 29ᵃ may be made effective for controlling the stylus bar and stopping and starting the motor.

I am aware that numerous details of construction may be varied through a wide range without departing from the principles of this invention, and I therefore do not purpose limiting the patent granted otherwise than necessitated by the prior art.

I claim as my invention:

1. In a phonograph having a stylus bar and record cylinder, an operated driving shaft, an adjustable element, and a device on the driving shaft cooperating with said element for swinging said stylus bar and stopping said operated shaft.

2. In a phonograph, the combination with the stylus bar, of an adjustable element cooperating therewith to swing the same to starting position and driving mechanism for operating said element, said element arresting said driving mechanism when said bar has been swung to its starting position.

3. In a phonograph, a stylus bar, an adjustable element having a trip member cooperating with said stylus bar for adjusting said bar, an abutment, and driving mechanism cooperating with said abutment to adjust said element and be stopped thereby at the limit of said adjustment.

4. In a phonograph, the combination with the stylus bar, of an adjustable device therefor, a rotatable element operable for adjusting said device into operative position and then be arrested thereby during one direction of rotation of said element, said element adjusting said device to inoperative position and then arrested thereby during the opposite rotation thereof.

5. In a phonograph, a record, a stylus bar having an arm, an adjustable device for said stylus bar, operating mechanism including a rotatable power shaft for rotating said record, and a cam device operated by said power shaft for shifting said arm to raise the stylus bar and for adjusting said device to swing said stylus bar to initial position at the end of a record, said adjustable device arresting said power shaft at the completion of said record.

6. In a phonograph, a record cylinder, a stylus bar co-operating therewith, mechanism for rotating said cylinder comprising a spring actuated element, a shiftable member for swinging and holding said stylus bar in its initial position and for braking said mechanism, and a rotatable device operable by said element for shifting said member for releasing said mechanism and said stylus bar.

7. In a phonograph, a record cylinder, a stylus arm, mechanism for rotating said record cylinder, and a shiftable element adapted for swinging said stylus bar and braking said mechanism and operable by said mechanism.

8. In a phonograph, a stylus arm, a support therefor, a spring actuated element, a record cylinder, mechanism operatively connecting said record cylinder and spring actuated element, and a slidable member actuated by said element for braking said mechanism and swinging said stylus arm at a predetermined time.

9. In a phonograph, a record cylinder, means including a spring actuated element for rotating said cylinder, a cam member on said element, and a movable abutment actuated by said cam for braking said means and arresting the rotation of said element.

10. In a phonograph, a record cylinder, mechanism including a spring actuated element for rotating the same, a stylus bar and mechanism for supporting the same for movement in planes at substantially right angles to each other, and mechanism operated by the rotation of said element in one direction for swinging the stylus bar in said planes, braking said first mentioned mechanism and arresting the rotation of said element.

11. In a phonograph, an adjustable element for applying a braking action and for swinging the stylus bar, and a rotatable power element adapted for shifting said element in opposite directions and be arrested thereby during either direction of rotation.

12. In a phonograph, a record cylinder, means including a rotatable element for rotating the same, a stylus arm, and mechanism operable through one direction of rotation of said element for swinging said stylus arm to and retaining the same in its initial, inoperative position and applying a braking action to said means, said mechanism being operated through the opposite rotation of said element for releasing said stylus arm and said braking action.

In testimony whereof I have hereunto subscribed my name in the presence of two subscribing witnesses.

ALBERT D. PHILPOT.

Witnesses:
 SPENCER W. GIBBS,
 EDWARD W. WEIKERT.